July 28, 1936. H. J. HARTLEY Re. 20,046
PROCESS FOR TREATING SEWAGE OR SIMILAR MATERIAL
Original Filed Aug. 17, 1934
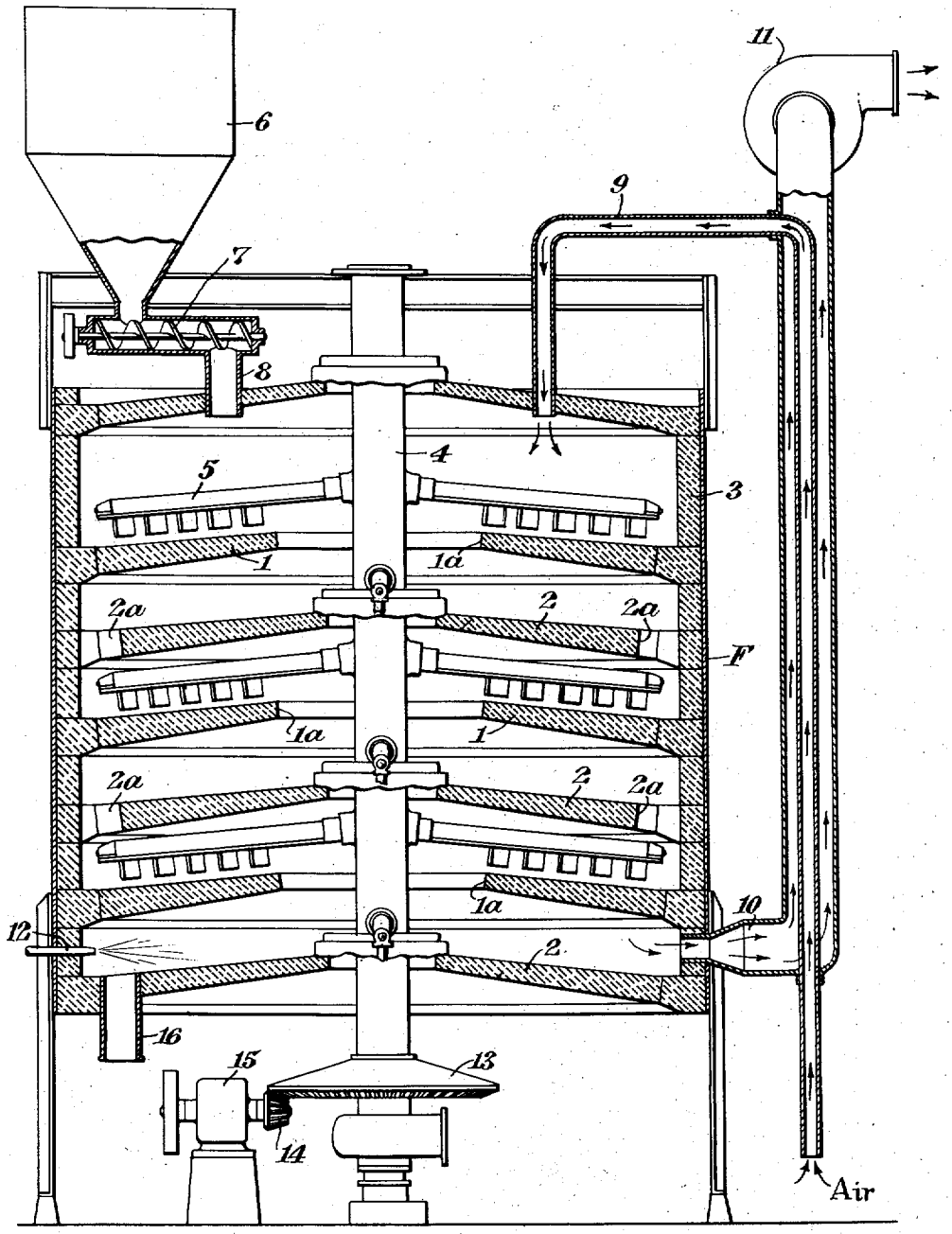
INVENTOR
Henry J. Hartley,
BY
Ward, Crosby & Neal
ATTORNEYS Reissued July 28, 1936

Re. 20,046

UNITED STATES PATENT OFFICE 20,046

PROCESS FOR TREATING SEWAGE OR SIMILAR MATERIAL

Henry J. Hartley, Hastings-upon-the-Hudson, N. Y., assignor to Nichols Engineering and Research Corporation, New York, N. Y., a corporation of Delaware Original No. 2,015,052, dated September 17, 1935, Serial No. 740,250, August 17, 1934. Application for reissue June 3, 1936, Serial No. 83,316

5 Claims. (Cl. 110—15)

My invention relates to processes for treating sewage, or the like material, the invention being particularly adapted to the treatment of sewage.

In accordance with the invention, the gaseous products resulting from combustion of such material are withdrawn from the furnace chamber after passage through the combustion zone thereof to thereby greatly decrease or substantially eliminate the noxious or objectionable odors in said gaseous products of combustion.

Various other objects, advantages and characteristics of my invention will become apparent from the following description.

My invention resides in the process, process steps, system, and features of the character hereinafter described and claimed.

For an understanding of my invention and for an illustration of one of the forms my apparatus may take, for carrying out the invention, reference is to be had to the accompanying drawing, in which:

The figure is a vertical sectional view, partly in elevation, of a furnace arrangement as constructed and arranged in accordance with my invention.

As shown on the drawing, F represents any suitable furnace or combustion chamber such, for example, as a multiple hearth furnace of the Herreshoff type. As is well understood, a furnace of this character comprises a plurality of superposed hearths surrounded and supported by the usual furnace wall structure. As illustrated, the hearth arrangement is such that a plurality of hearths 1 and 2 are provided, a hearth 2 being disposed between each pair of hearths 1, each hearth 1 being provided with a central opening 1a, each hearth 2 being provided with one or more outer openings 2a, and all of the hearths being secured in and supported by the furnace wall structure 3.

Extending axially through the center of the wall structure 3 is a suitably journalled, vertical rotatable shaft 4 which may be provided with radially extending rabble arms 5 utilizable for rabbling the material over each of the hearths in succession down through the furnace. As disclosed in Herreshoff U. S. Letters Patent No. 976,175, November 22, 1910, the central shaft 4 and the rabble arms 5 may define conduits through which a cooling medium is adapted to circulate. In other respects, the usual design of furnaces of this general type may be followed and if desired, the furnace arrangement may be of the general type disclosed in U. S. Letters Patent No. 1,669,925, May 15, 1928.

Preferably, the material to be treated is ground in suitable manner to break up the large pieces and then filtered to remove such quantities of moisture as may readily be disposed of in that manner. Upon completion of this operation, the material may be fed into a hopper 6 from which a screw conveyor 7, or equivalent, serves to transport the material so that it drops down through a conduit 8 which terminates interiorly of the furnace F. From the conduit 8, the material falls upon the uppermost hearth 1 and is rabbled inwardly by the teeth on the upper rabble arm 5 so that said material passes downwardly through the opening 1a of the upper hearth 1 and thereby reaches the uppermost hearth 2. On the hearth last named, the material is rabbled outwardly by the rabble arm which coacts therewith, the material eventually dropping from said hearth 2 through the openings 2a at the edge thereof. In this manner, the material to be treated or incinerated is rabbled alternately inwardly and outwardly across the superposed hearths of the furnace, the material dropping through the inner opening of one hearth to the next lower hearth and, after passage thereacross, dropping through the openings at the periphery thereof so as to reach the periphery of the hearth therebeneath.

The material, as it passes downwardly through the furnace, is first dried and then incinerated, the operation last noted occurring principally in the lower area of the furnace. It will be understood that air is necessarily supplied to the interior of the furnace for the purpose of supporting combustion. In accordance with my invention, such air is admitted into the furnace at or adjacent the top thereof and withdrawn from said furnace in the region of the bottom thereof, the air, therefore, passing downwardly through the furnace in the same general direction as is taken by the descending sewage material under treatment.

The arrangement for causing the air to move downwardly through the furnace in the manner last described may be of any suitable character. To this end and as herein shown, a pipe or conduit 9 is so positioned that it opens into the top of the furnace chamber F. A second pipe or conduit 10 opens into the bottom of said furnace chamber F and has an exhaust fan 11, or equivalent device, connected thereto. When the exhaust fan 11 is operated by a suitable motor, not shown, the products of combustion are withdrawn from the bottom of the furnace F and caused to pass upwardly through said conduit 10, and to be discharged to the atmosphere, if desired. The products of combustion which are thus withdrawn from the furnace are replaced by air which enters the top thereof through the conduit 9 which, preferably, communicates with the atmosphere as shown. Accordingly, in accordance with the invention, a down-draft stream of air and gases is established within the furnace chamber and this is maintained during continued operation of the fan 11.

With the furnace in operation, combustion of the descending sewage material proceeds on one or more of the lower furnace hearths. Ordinarily, the gases evolved from the material under treatment would rise through the furnace but, as stated above, the fan 11 establishes a down-draft stream of air. Therefore, this air stream together with the evolved gases necessarily passes through the above noted combustion zone and it is in this zone that the temperature is at a maximum interiorly of the furnace chamber.

It results, therefore, due to the high temperature obtaining in said combustion zone and further due to the presence of atmospheric air which previously had entered the furnace chamber that the hydrocarbon content of the gases evolved by heat treatment of the sewage material are largely or substantially entirely burned. Accordingly, the gaseous material which passes to the atmosphere through the conduit 10 is largely or substantially free from noxious gases which, if present, would cause annoyance to persons in the vicinity.

From the viewpoint of efficiency and economy, it is desirable for the hot gases passing from the furnace chamber to be brought into heat-exchanging relation with respect to the stream of air passing toward and into said furnace. This feature of the invention is illustrated on the drawing which shows a long section of the inlet pipe 9 as disposed interiorly of a corresponding section of the outlet pipe 10. By virtue of this relation, it is obvious that the gases passing to the top of the furnace chamber by way of the pipe 9 are pre-heated by the hot gases passing through the pipe 10. In lieu of a heat-exchange arrangement of the character shown, it is to be understood that any other suitable type of arrangement may be utilized for accomplishing this purpose.

As stated, an important feature of the invention relates to the passage or withdrawal of the hydrocarbon vapors through the hottest zone of the furnace chamber, i. e., the lower hearth or hearths on which occurs the principal combustion of the sewage material. Under such conditions, it will be understood that the invention is not to be limited to the passage of atmospheric air from the pipe 9, or equivalent, into the top of the furnace chamber. As well, under some circumstances, this air may be introduced into said furnace chamber nearer the middle thereof although it will be understood that it is advantageous for such air to pass along a path of extended length while in contact with the sewage material so as to more effectively dry the same.

As shown on the drawing, one or more gas or oil nozzles 12, or equivalent, may be associated with the furnace chamber so as to supply additional heat above the lower hearth or hearths. The heat obtained from these sources may be utilized at any time when the furnace is to be placed in operation and, under some circumstances, it may be desirable to utilize such heat sources intermittently or continuously so as to obtain such number of heat units in the combustion zone as may be required to efficiently burn the sewage material and maintain the temperature of such zone sufficiently high to eliminate the hydrocarbon vapors of the gaseous products of combustion which are passed therethrough. It will be understood that any other suitable heat source may be substituted for those described immediately above and, further, it will be understood that such heat sources may be disposed either interiorly or exteriorly of the furnace chamber as desired.

As shown, the shaft 4 carries a lower gear 13 with which meshes a second gear 14 operated by a suitable motor 15 or other equivalent device. With the motor 15 operating, the sewage material descending through the pipe 8 passes along a circuitous path downward through the furnace chamber. Such material is temporarily retained on each of the hearths while being advanced thereacross, the material, on each hearth 1 being moved toward the shaft 4 and, on each hearth 2, being moved outwardly from said shaft 4.

The air which is admitted into the furnace chamber through the pipe 9, or equivalent, likewise passes along a circuitous descending path while contacting with the descending sewage material. It will be understood that such air passes inwardly toward the shaft 4 above the hearths 1 and outwardly from said shaft above the hearths 2, the air passing downwardly through the inner passages 1*a* of the respective hearths 1 and the outer passages 2*a* of the respective hearths 2. As a result, the sewage material is dried in an effective manner in the upper furnace regions and as such material descends through the furnace, it becomes progressively drier. On one or more of the lower hearths, combustion of the dried material is completed and, under proper operating conditions, it results that such material becomes principally an ash by the time it reaches the lower hearth from which it may be removed through a suitable conduit 16 or the like.

Under some circumstances, it may be desirable to treat the moist material on the upper hearth or hearths with one stream of air, preheated or otherwise, and to treat the dry and burning material on the lower hearths with another stream of air. Due to the moist condition of the material, the first named stream of air remains substantially odorless and hence may be passed to the atmosphere without objection. The second named stream of air becomes odor-laden, however, and it is this air stream which is passed down-draft through the combustion zone or otherwise treated to deodorize the same, i. e., effect the removal of noxious odors. By proceeding in the manner just described, it is obvious that there is a substantial decrease in the volume of air which is subjected to heat treatment. This, of course, is decidedly advantageous.

In view of all the foregoing, it becomes obvious that my novel process is especially advantageous, useful and efficient because depending principally or entirely upon the heat generated by combustion of the sewage material for the elimination of noxious odors from the hydrocarbon gases. The expense of the complete operation is substantially decreased while, at the same time, the amount of equipment is decreased in comparison with the equipment required by prior art arrangements for accomplishing the same end.

While the invention has been described with respect to certain particular preferred examples which give satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. The process of treating sewage or similar material, which comprises passing said material downwardly through a plurality of superposed zones while first drying and then burning the same, temporarily retaining said material in each of a plurality of said zones, moving said material horizontally through each of said zones by the application of a series of successive rabbling impulses thereto, passing a stream of air downwardly through said zones along the path of travel of the material at each of said zones successively, whereby the gaseous products of combustion produced with said air are made substantially free of noxious odors in passing through the lower of said zones where burning occurs, discharging said products of combustion from the lowermost zone by suction, and subjecting said air prior to its introduction to the uppermost zone to heat interchanging relationship with the exit gases from said lowermost zone.

2. The process of incinerating sewage material to form an ash and evolved gases free of noxious odor, which comprises first treating the material to remove therefrom a substantial portion of the moisture content thereof, then passing said material downwardly through a plurality of superposed zones while first drying and then burning the same, temporarily retaining said material in horizontal layers at each of said zones while periodically agitating and advancing it through each zone and gradually from zone to zone, said drying being effected by introducing a stream of preheated air into contact with the material at the zones of drying, and passing said stream of air downwardly from said drying zones along the path of travel of the material through the zones of burning, whereby the gases evolved from the drying material and the gaseous products of combustion are heated at the zones of burning, to a high temperature for the substantial elimination of noxious odors therefrom.

3. The process of incinerating sewage material to form an ash and evolved gases free of noxious odor, which comprises first treating the material to remove therefrom a substantial portion of the moisture content thereof, then passing said material in succession through a plurality of superposed zones, the material being admitted into the top zone and passed downwardly from zone to zone, drying the material during its passage through an upper zone or zones, and burning the material during its passage through lower zones, temporarily retaining said material in substantially horizontal layers at each of said zones while periodically agitating it and gradually advancing it through each zone and causing it to drop from zone to zone, said drying being effected by introducing a stream of preheated air into contact with the material at said upper zone or zones of drying, passing said stream of air through the drying zone or zones in extended contact with said layers and then into and through the lower zones of burning, whereby the gases and vapors evolved from the drying material as well as the gaseous products of combustion evolved at the burning zones are heated in the zones of burning, to a high temperature for substantial elimination of noxious odors therefrom, and preheating said stream of air for introduction at said zone or zones of drying by bringing such air into heat interchanging relationship with the hot gaseous products from the burning zones.

4. The process of incinerating sewage material to form an ash and evolved gases free of noxious odor, which comprises first treating the material to remove therefrom a substantial portion of the moisture content thereof, then passing said material in succession through a plurality of superposed zones, the material being admitted into the top zone and passed downwardly from zone to zone, drying the material during its passage through an upper zone or zones, and burning the material during its passage through lower zones, temporarily retaining said material in substantially horizontal layers at each of said zones while periodically agitating it and gradually advancing it through each zone and causing it to drop from zone to zone, said drying being effected by introducing a stream of preheated air into contact with the material at said upper zone or zones of drying, and passing said stream of air through the drying zone or zones in extended contact with said layers and then into and through the lower zones of burning, whereby the gases and vapors evolved from the drying material as well as the gaseous products of combustion evolved at the burning zones are heated in the zones of burning, to a high temperature for substantial elimination of noxious odors therefrom.

5. The process of incinerating sewage material to form an ash and evolved gases free of noxious odor, which comprises first treating the material to remove therefrom a substantial portion of the moisture content thereof, then passing said material in succession through a plurality of superposed zones, the material being admitted into the top zone and passed downwardly from zone to zone, drying the material during its passage through an upper zone or zones, and burning the material during its passage through lower zones, temporarily retaining said material as a layer at each of said zones while periodically agitating it and while it is gradually advanced through each zone, said drying being effected by introducing a stream of preheated air into extended contact with said layers of material at said zone or zones of drying, then passing said stream of air from the drying zone or zones into and through the lower zones of burning, the gaseous products of combustion and vapors evolved from the material being then withdrawn through substantially the hottest burning zone, to insure of their being subjected before their exit, to a high temperature for substantial elimination of obnoxious odors therefrom, and preheating said stream of air prior to its introduction into the zone or zones of drying by bringing such air into heat interchanging relationship with the hot withdrawn gases and vapors.

HENRY J. HARTLEY.